United States Patent [19]

Scanlon et al.

[11] Patent Number: 4,580,518
[45] Date of Patent: Apr. 8, 1986

[54] TRANSMISSION SHIFT INDICATOR WITH ADJUSTMENT MECHANISM

[75] Inventors: Jerome M. Scanlon, Madison Heights; Francis N. Smith, Clarkston, both of Mich.

[73] Assignee: General Motors Corporation, Detroit, Mich.

[21] Appl. No.: 449,535

[22] Filed: Dec. 13, 1982

[51] Int. Cl.[4] ............................................. G01D 7/00
[52] U.S. Cl. ............................ 116/28.1; 116/DIG. 20
[58] Field of Search .............. 116/28.1, DIG. 20, 291, 116/292, 331, 324, 323, 313, 307, 311, 303, 321, 297, 312, 315, 314, 282

[56] References Cited

U.S. PATENT DOCUMENTS

| 2,925,061 | 2/1960 | Thornburgh | 116/DIG. 20 |
| 3,148,660 | 9/1964 | Hiers | 116/282 |
| 4,446,809 | 5/1984 | Dennis | 116/28.1 |

FOREIGN PATENT DOCUMENTS 859829 12/1952 Fed. Rep. of Germany ...... 116/297

Primary Examiner—Charles Frankfort
Assistant Examiner—Denis E. Corr
Attorney, Agent, or Firm—Donald F. Scherer

[57] ABSTRACT

A transmission shift indicator for a floor-mounted transmission shift lever has a pointer to indicate the drive position selected by the operator. The indicator mechanism including the pointer is self-adjusting through a ratcheting detent mechanism connected between the indicator and the manual shift lever. The indicator contacts a stop member at the extreme limits permitted for transmission ratio selection such as low (L) or Park (P). The manual transmission lever, as permitted by the ratchet detent mechanism, can continue movement after stoppage of the indicator until the transmission is actually positioned at the desired setting so that the indicator and the actual setting are in agreement. The relative positioning thus achieved is maintained by the ratchet detent mechanism.

2 Claims, 4 Drawing Figures

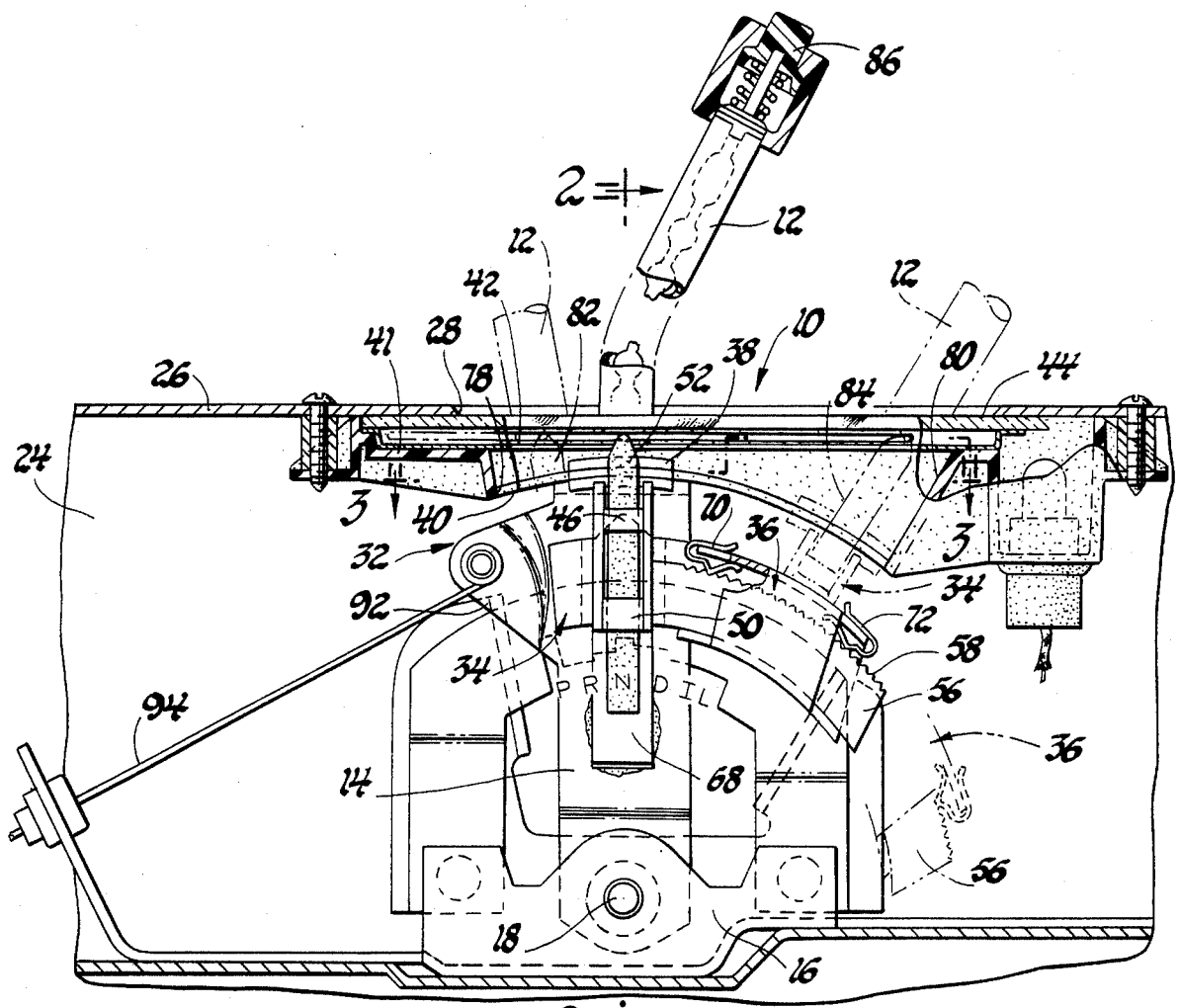
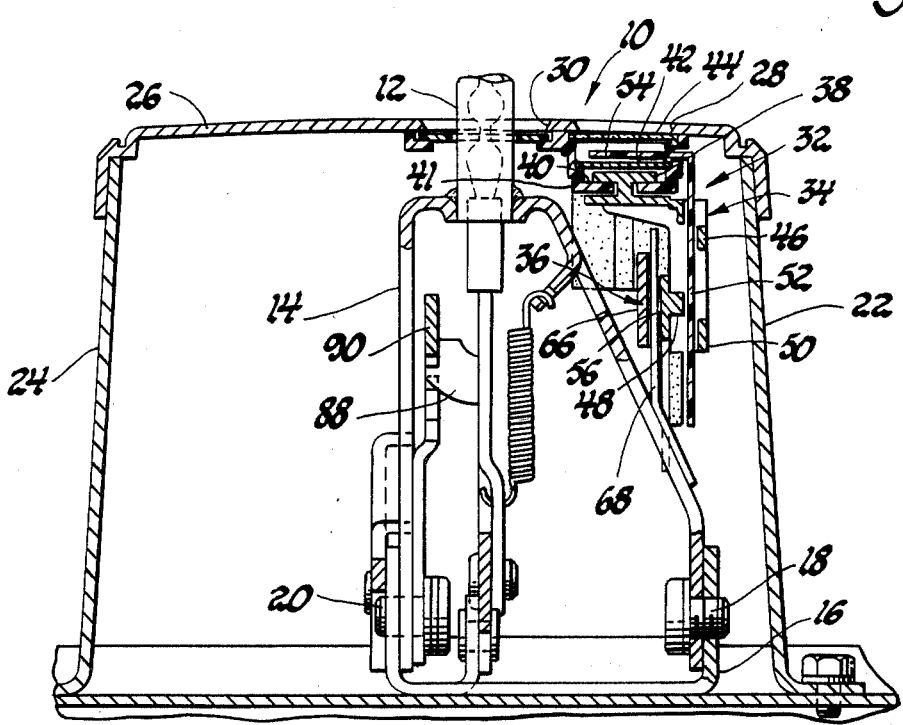

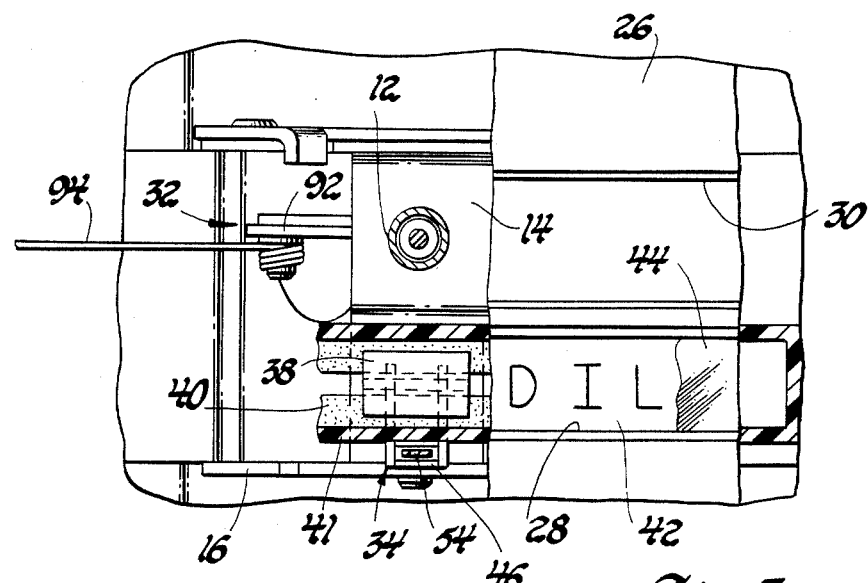
Fig.3
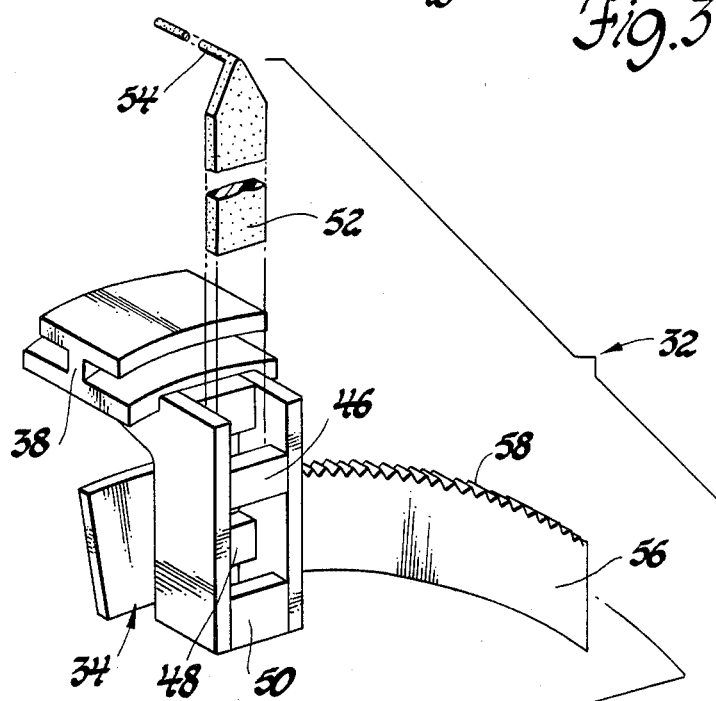
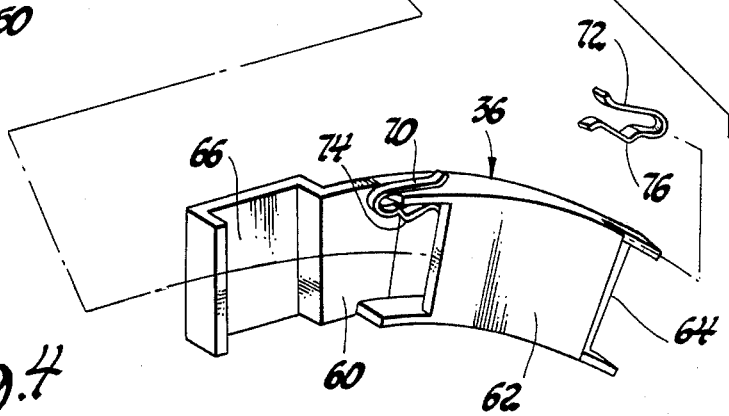
Fig.4

TRANSMISSION SHIFT INDICATOR WITH ADJUSTMENT MECHANISM

This invention relates to transmission indicator adjustment mechanisms and more particularly to self-adjusting indicator mechanisms.

It is an object of this invention to provide an improved self-adjusting indicator mechanism for a floor-mounted transmission shift mechanism wherein the indicator is connected to the manual shift lever through a ratchet detent mechanism and wherein the indicator abuts a stop surface at one or both of the travel limits and the detent ratchet mechanism permits relative movement between the manual lever and the indicator until the manual lever is moved to the drive position corresponding to the travel limit.

It is another object of this invention to provide an improved self-adjusting indicator mechanism wherein one portion of the mechanism including a pointer is slidably disposed on the transmission shift console and in a guide mechanism movable with the manual transmission lever and wherein the guide member and the one portion are interconnected by a detent mechanism such that the one portion can contact a stop surface while the guide member can continue movement with the transmission shift lever until agreement between the position indicated by the indicator and the actual position of the transmission lever is achieved.

These and other objects and advantages of the present invention will be more apparent from the following description and drawings in which:

FIG. 1 is an elevational view partly in cross section of a floor-mounted transmission shift console and indicator mechanism;

FIG. 2 is a sectional view taken along line 2—2 of FIG. 1;

FIG. 3 is a cross-sectional view taken along line 3—3 of FIG. 1; and

FIG. 4 is an exploded view of the components of the indicator mechanism.

Referring to the drawings, wherein like characters represent the same or corresponding parts throughout the several views, there is seen in FIG. 1 a floor-mounted transmission shift mechanism, generally designated 10, including a manual transmission lever 12 which has a bracket assembly 14 pivotally mounted on a support member 16 by a pair of fasteners 18 and 20. The support member 16 is secured to the vehicle floor structure. The bracket assembly 14 is housed in a console having sidewalls 22 and 24 which are secured to the vehicle floor structure and a top member 26 which is secured to the sidewalls 22 and 24.

The top member 26, as seen in FIG. 2, has two openings generally designated as 28 and 30. The manual lever 12 extends through the opening 30 while the opening 28 accommodates the transmission indicator mechanism generally designated 32. The transmission shift indicator 32 includes a slide member 34 and a guide member 36. These members are best seen in FIG. 4. The slide member 34 has a lateral extending I section 38 which is slidably disposed on a track 40 formed in a housing 41 which is secured in the opening 28 of top 26. Also secured in the opening 28 is an indicia surface 42 partially seen in FIG. 3 and a lens 44.

The slide 34 has three spaced sidewalls 46, 48 and 50 which cooperate to provide a vertical opening for an indicator bar 52 which has a pointer portion 54. The pointer portion 54 is disposed between the lens 44 in the indicia surface 42 and therefore indicates the drive position selected by the operator through the manipulation of manual lever 12. The slide member 34 also has an arcuate section 56 which has formed thereon a plurality of teeth 58.

The guide member 36 has three vertical walls 60, 62 and 64 which cooperate to form an arcuate slot which houses arcuate section 56 of slide 34. The guide member 36 also has a vertically extending U-shaped channel 66 in which is disposed a finger 68 which is secured to the bracket assembly 14. The finger 68 is therefore shiftable or pivotable with the manual lever 12 such that the guide member 36 will always be positioned by the transmission control lever 12 at the actual transmission operating condition.

A pair of spring clips 70 and 72 are secured to the guide member 36. Each spring clip 70 and 72 has a respective detent portion 74 and 76 which will resiliently mesh with the teeth 58 to provide a detent ratcheting mechanism. The slide member 34 is thus resiliently connected to the guide member 36 and will, if unimpeded, be movable with the manual transmission lever 12.

The housing 41 has formed thereon a pair of stop surfaces 78 and 80 adjacent respective ends of the track 40. The stop 78 will cause the pointer 54 to be aligned with the Park (P) position indicated by phantom line 82 while the stop 80 will cause the pointer 54 to be aligned with the Low (L) position indicated by phantom line 84.

At initial assembly of the transmission indicator, the pointer 54 may not agree with the actual transmission ratio selected by the manual shift lever 12. After assembly, however, the manual transmission lever 12 can be moved to the Low (L) position phantom line 84 and to the Park (P) position phantom line 82. If the indicator mechanism is leading the shift lever when the shift lever is moved to the Low position, the I section 38 will contact the stop 80 thus preventing further movement of the slide member 34 while the manual lever 12 can continue movement due to the ratcheting mechanism comprised of the spring clips 70 and 72 and teeth 58 until the transmission control is actually in the Low (L) position. At this point, the manual lever 12 and indicator pointer 54 will be in agreement for all transmission ratios selected.

If the transmission indicator pointer 54 is leading the manual shift lever movement when pivoted to the Park (P) position, I section 38 will contact the stop 78 thus preventing further movement of guide 34 in the track 40. However, the manual transmission lever will continue movement until the actual Park (P) position is achieved. The relative movement between the slide member 34 and guide 36 will be permitted by the ratcheting mechanism of spring clips 70 and 72 and teeth 58.

Thus, it is apparent that the transmission indicator mechanism will be self-adjusting regardless of the direction of initial misalignment. Once the transmission manual lever 12 and pointer 54 are in synchronization, the ratcheting mechanism will maintain this alignment such that further adjustment will not be necessary. However, if for some reason misalignment should occur, such as during repair, the self-adjusting mechanism will bring the pointer 54 and manual lever 12 back into synchronization when the shift lever 12 is moved from one travel extreme to the other.

The manual lever 12 includes a conventional push-button mechanism 86 which is operable to control the shift detent pawl 88 which is connectible with a conventional detent plate 90 to control the movement of the transmission lever 12 by the operator in a well-known manner. The bracket 14 also includes an ear 92 to which is connected a push/pull cable 94. The push/pull cable is connected in a well-known manner to a conventional transmission manual control valve.

The indicator 52 is free to move vertically to the slide member 34 such that the pointer 54 can travel on a horizontal track while the guide 36 travels on an arcuate track. The vertical channel 66 and finger 68 provide a drive connection between the guide 36 and transmission shift lever 12 which will accommodate various production tolerances which might be present and simplify the assembly of the transmission shift indicator mechanism.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in indicator adjustments for floor-mounted transmission shift lever mechanisms wherein the shift lever is movable to a plurality of transmission drive positions and is operatively connected with an indicator means including a pointer for permitting the operator to determine the drive position selected and indicia for each drive position, the improvement comprising; a guide member connected with said shift lever; slide means slidably disposed in said guide member including indicator support means for containing the indicator means; selectively releasable detent means for releasably securing said slide means in said guide member, said detent means being releasable upon application of sufficient force between said slide means and said guide member; and stop means disposed on said shift lever mechanism for limiting the movement of the slide means and indicator means in one direction at a position indicating a drive position which is disposed at one extent of the shift lever travel and said selectively releasable detent means permitting travel of said guide member and shift lever relative to said slide means, after said slide means engages said stop means thereby exerting said sufficient force to permit proper alignment of said indicator means with said drive position indicia when said shift lever is at the full extent of travel.

2. An improvement in indicator adjustments for floor-mounted transmission shift lever mechanisms wherein the shift lever housed in a console is movable to a plurality of transmission drive positions between travel limits indicated by indicia, Park (P) and Low (L) with indicia therebetween and is operatively connected with an indicator means including a pointer for permitting the operator to determine the drive position selected by the indicia for each drive position, the improvement comprising; a track member secured in the console; a guide member connected with said shift lever; slide means slidably disposed on said track member and having a toothed section disposed in said guide member, said slide means including indicator support means for supporting the indicator means; selectively releasable detent spring means disposed on said guide member and engaging said toothed section for releasably securing said slide means in said guide member, said detent means being releasable upon application of sufficient force between said slide means and said guide member; and stop means disposed on said track member for limiting the movement of the slide means and indicator means at the travel limits which are disposed at the ends of the shift lever travel and said selectively releasable detent spring means permitting travel of said guide member and shift lever relative to said slide means, after said slide means engages said stop means thereby exerting said sufficient force to permit proper alignment of said indicator when said shift lever is at the limits of travel.

* * * * *